(12) United States Patent
Jennette

(10) Patent No.: US 6,887,139 B2
(45) Date of Patent: May 3, 2005

(54) SANDER BLOCKS FOR MINISAWS

(76) Inventor: Basil G. Jennette, 5618 Eastridge Dr., Sacramento, CA (US) 95842

( * ) Notice: Subject to any disclaimer, the term of this patent is extended or adjusted under 35 U.S.C. 154(b) by 420 days.

(21) Appl. No.: 09/956,714

(22) Filed: Sep. 19, 2001

(65) Prior Publication Data

US 2002/0052176 A1 May 2, 2002

Related U.S. Application Data

(63) Continuation-in-part of application No. 09/550,134, filed on Apr. 17, 2000, now abandoned.

(51) Int. Cl.[7] .............................................. B24B 7/00
(52) U.S. Cl. ........................ 451/164; 451/344; 451/356
(58) Field of Search ............................... 451/164, 344, 451/356, 162

(56) References Cited

U.S. PATENT DOCUMENTS

| | | | | |
|---|---|---|---|---|
| 3,914,906 A | * | 10/1975 | Barnes | ....................... 451/356 |
| 4,128,970 A | * | 12/1978 | Sawrenko | .................... 451/356 |
| 4,707,947 A | * | 11/1987 | Harris | ......................... 451/356 |
| 5,209,022 A | * | 5/1993 | McCambridge | ............. 451/356 |
| 5,707,176 A | * | 1/1998 | Holko et al. | ................. 451/356 |
| 5,759,093 A | * | 6/1998 | Rodriguez | ................... 451/356 |

* cited by examiner

Primary Examiner—Eileen P. Morgan
(74) Attorney, Agent, or Firm—Mark C. Jacobs

(57) ABSTRACT

A device for use with air and electric powered and manual minisaws all of which are used with reciprocating action, to extend the functionality of the saw. The device is a sanding block having a vertical arm attached to a mounting plate on a first side of the plate. A sanding member having a top surface is glued or otherwise attached to the second side of the plate. The mount plate may be coextensive with the top surface of the sanding member. The arm includes an insertion section dimensioned to be engaged by the slot in the chuck of the saw and which insertion section is spaced from said mount plate and the rear edge of which is disposed rearward of said mount plate.

24 Claims, 4 Drawing Sheets

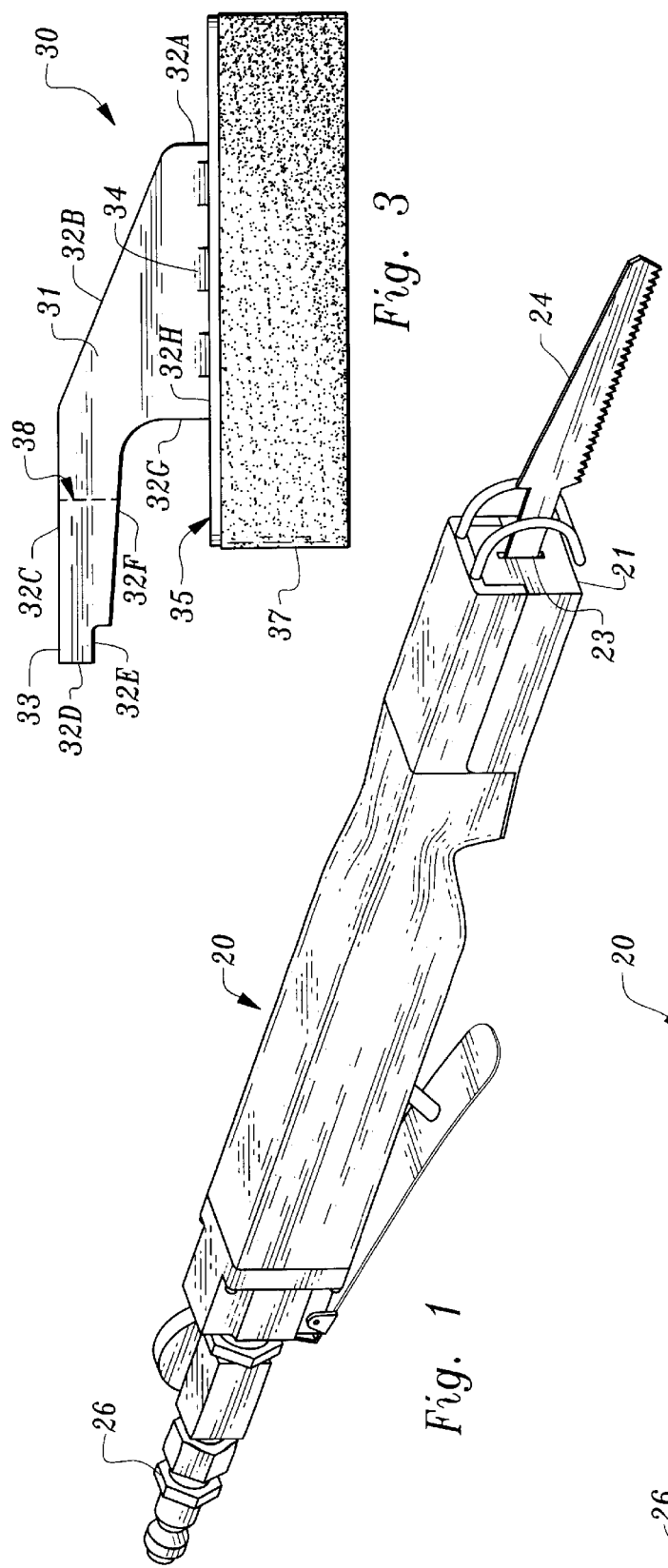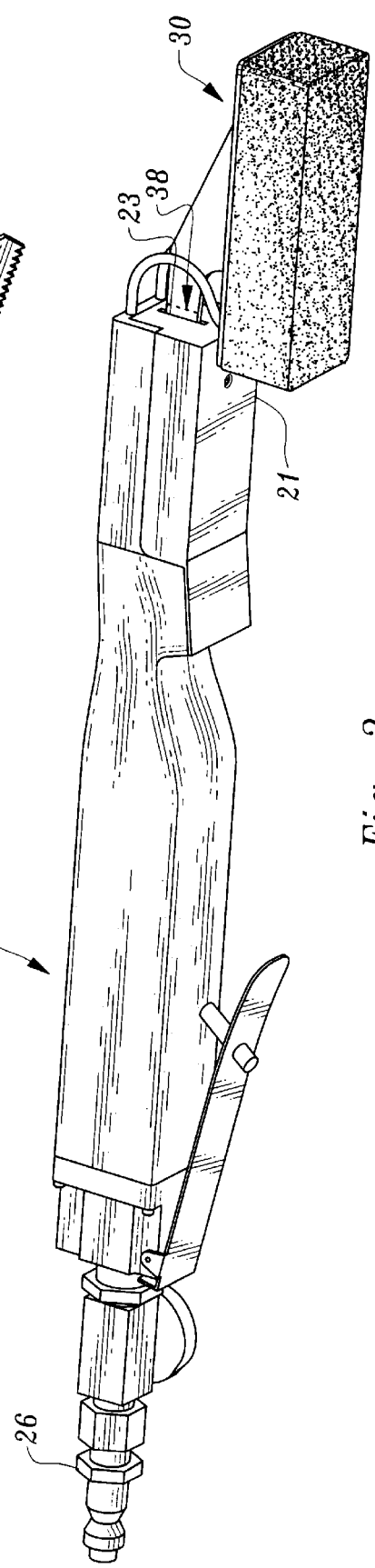

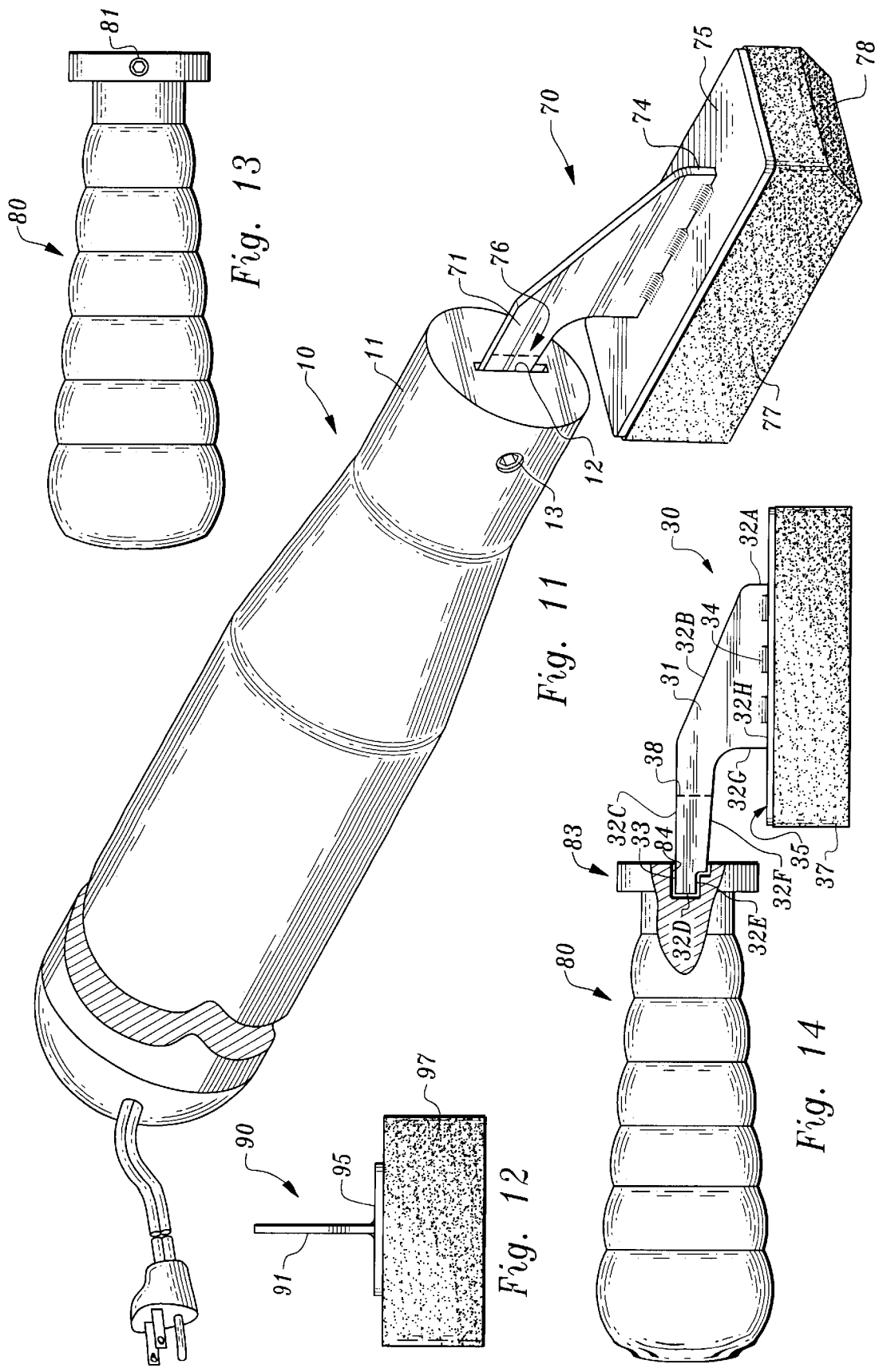

SANDER BLOCKS FOR MINISAWS

RELATIONSHIP TO OTHER APPLICATIONS

This application is a continuation in part of my application Ser. No. 09/550,134 filed Apr. 17, 2000 now abandoned.

FIELD OF THE INVENTION

This invention relates to a device that can be used with a minisaw to give the saw additional functionality.

BACKGROUND OF THE INVENTION

Many saws are well known as saws that can be used with one hand to make cuts in tight places. Such saws maybe air, electrically or hand operated. These saws can be used for cutting straight or curved surfaces in steel, aluminum, fiberglass, plastic and perhaps even wood. These minisaws when powered resemble a small reciprocating saw. Such saws carry out similar functions when the unit is manually operated such that the reciprocation is in one's arm motion.

While these minisaws have the ability to achieve cuts, there is indeed a need to increase the capability of these saws, for several reasons. One, after using the minisaw, sometimes it may be necessary to sand an area, especially small areas, that have been cut, and sometimes it may be necessary to reshape an area beyond the straight cut capability of the minisaw, be it air, electric or hand operated. Such is especially true in the automotive repair industry.

The sanding blocks of this invention permit the need of being able to carry out the sanding process in confined quarters quickly and easily, using the minisaw as the holder for the sanding blocks of this invention.

It is an object therefore to provide sanding blocks that can be engaged by manual and powered minisaws.

It is another object to provide sanding blocks that are configured in various shapes to permit sanding in directions and in different amounts, when mounted in a minisaw.

It is a third object of this invention to provide sanding blocks that are quickly engaged by a minisaw and which are readily removable from the minisaw when a change of sanding block is desired.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is a perspective view of a prior art air operated minisaw with a saw blade engaged in its chuck, used for making one-hand saw cuts in tight places.

FIG. 2 is a side perspective view of the prior art saw of FIG. 1 with one embodiment of the sander blocks of this invention engaged therein in place of a saw blade.

FIG. 3 is a side elevational view of the first embodiment of the minisaw sander blocks of this invention.

FIG. 11 is a perspective view of a small electric operated minisaw of the prior art with the third embodiment of the sander blocks of this invention engaged therein.

FIG. 12 is a front elevational view of a variant of the mount plate aspect employed in the devices of this invention.

FIG. 13 is a side elevational view of the handle of a prior art hand-operated minisaw, i.e., without a blade.

FIG. 14 is the same view with the first embodiment of this invention disposed in the chuck of the handle.

SUMMARY OF THE INVENTION

Figure 4:
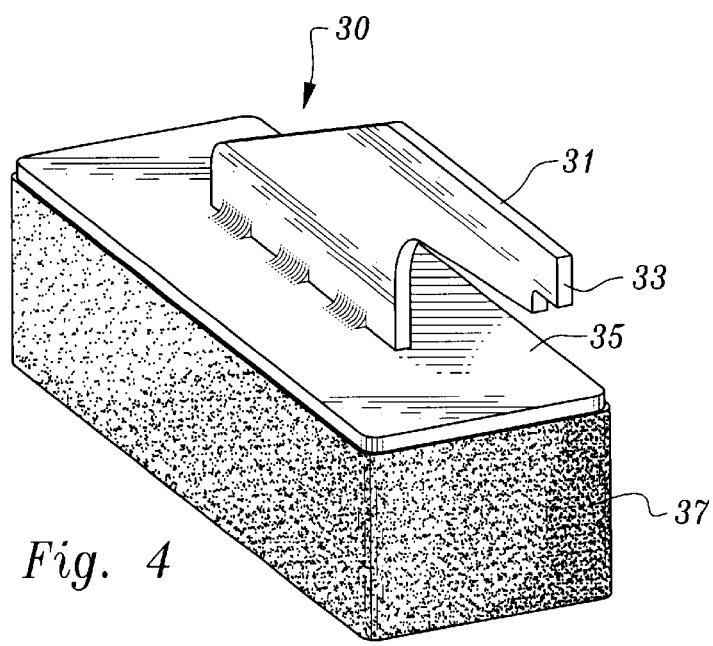
FIG. 4 is a rear perspective view thereof.

Small sander blocks of various configurations all of which have an upstanding arm with a rearwardly disposed top section which serves as a handle member, and a bottom section attached to one side of a base plate. The sander blocks have an insertion section adapted to be engageable by the chuck of hand and power operated minisaws to permit the sanding of small objects, and sanding in tight spaces where a hand sander could not be operated.

The sanding devices each have a specifically configured sanding member attached to the opposite side of the base plate as is the upstanding arm.

DESCRIPTION OF THE PREFERRED EMBODIMENT

In FIG. 1, an air operated minisaw sold by Sears among many vendors is seen and designated 20. This prior art reciprocating action minisaw has an air input 26 at its rear. Chuck 21 has a slot 23 to receive and retain a saw blade 24. Such chucks for retaining a saw blade or similar item are deemed conventional in today's world. This saw is seen also in FIG. 2.

In FIG. 3 the first embodiment of the sander blocks of this invention is seen. The sander block 30 has a mount plate or upstanding arm 31 of a multi sided configuration. The plurality of sides commence from a forward point at the base plate 35 wherein side 32A rises at a right angle to the base plate 35. At its upper terminus edge, side 32A intersects at about a 45-degree angle with the lower edge of oblique side 32B. At the upper end of oblique side 32B, top side 32C commences and extends generally horizontally rearwardly beyond the rear edge of the sanding element 37 attached to the under side of the base plate 35. Side 32C terminates at the top edge of side 32D of the upstanding arm and side 32D is generally normal to side 32C. Side 32D forms the rear edge of the insertion section, as defined infra. Side 32C is a relatively small side which would terminate at the beginning of a slightly descending inwardly extending lower side 32F, but for the presence of notch 32E. From the notch 32E, found at the imaginary intersection of 32D & 32E, emanates a first end of the lower wall 32F as noted. Lower wall 32F terminate at its second end at the beginning of radiused lower rearwall 32G. Lower rearwall's second end terminates at the base plate 35.

The lowermost side is 32H which runs between side 32G and side 32A. This side is welded or otherwise attached to the mount plate 35, described infra. Each of the sander blocks of this invention has an upstanding arm of this general configuration.

The narrow rear area defined by sides 32D, 32E and a portion of 32C constitutes the minimum area to define the insertion section 33, From a practical point of view, this insertion section may extend forwardly from rear edge 32D to phantom line 38 which runs between the edges 32C and 32F. The phantom line 38 is not located at a finite fixed point, but will vary in location according to the elevation and depth of the chuck slot which limit the amount that may be enveloped within the slot.

By the term insertion section, I mean the minimum area of the arm that fits into the chuck slot of the particular saw. This amount will vary slightly from saw to saw depending on the chuck's slot depth, elevation, and the relative position of the retaining screw. See FIGS. 2 & 3.

As can be seen the insertion section of the upstanding arm has critical dimension only in the elevation, and thickness since the chuck slot size for receipt and retention of the arm's insertion section is fairly standard in all minisaws, This statement is true because more often than not, the saw blades used in these saws are made by parties other than the saw maker. Thus, the need for standardization. While there is no criticality to the configuration of the arm other than the height of the insertion section which engages the chuck slot. The thickness of the upstanding arm should be about that of a hacksaw blade, on the order of $1/16$th to $1/8$th inch to be engageable by most saw chucks. As can be seen the insertion section is always spaced from the mount plate.

Each of the various embodiments of the tool of this invention includes an upstanding arm having an insertion section, which insertion section is typically $1/16$th to $1/8$ inch in thickness. The arm's total elevation is about 1 inch, and a total length of 2–4 inches. As seen in the figures, the arm 31 is attached normal to a mount plate such as 35 on the upper side of the mount plate. The sanding member such as 37 is attached on the underside of the mount plate. See FIG. 3 and FIG. 4.

In the FIG. 3 embodiment which is exemplary of all of the embodiments of this invention, the arm 31 is welded at weld points 34 to mount plate 35. Such construction works when both the arm and mount plate are steel. If either element is high impact plastic, or aluminum other means such as gluing or sonic welding must be employed. Indeed, arm 31 and mount plate 35 as well as the arms and mount plates of the other embodiments discussed herein maybe molded as one integrated unit.

The mount plate 35 is a flat approximate $1/8$-inch thick piece of sheet metal or plastic to which is secured on the upper side the upstanding arm, and on the lower side, the sanding member such as 37. Note that in the first embodiment, the mount plate 35 is coextensive in area to the upper surface of the sanding member 37.

Figure 5:
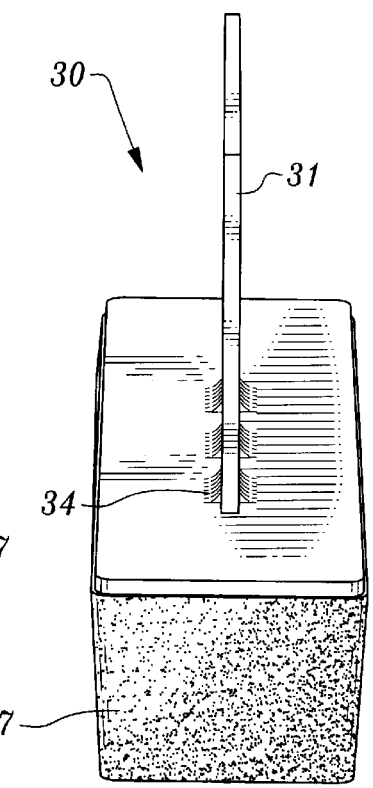
FIG. 5 is a top front perspective view of the first embodiment of the sander blocks of this invention.

The sanding member 37 shown in FIGS. 3, 4 and 5, is generally rectangular and may be of any grit size. Typical dimensions for the sanding member shown in FIGS. 3 and 4 are about 2.5 to 3 inches long, (front to back) $1/2$ inch to $3/4$ inch wide in elevation and from about $3/4$ inch to $1 1/2$ inch wide. Within this range, a specific preferred embodiment would be 3 inches×1.5 inches×0.5 inches high. Thus it is again seen that the sanding blocks of this invention are intended for small items and for use in tight spaces for larger items, where conventional tools are not appropriate due to size of work space or size of work tool limitations come into play.

Figure 6:
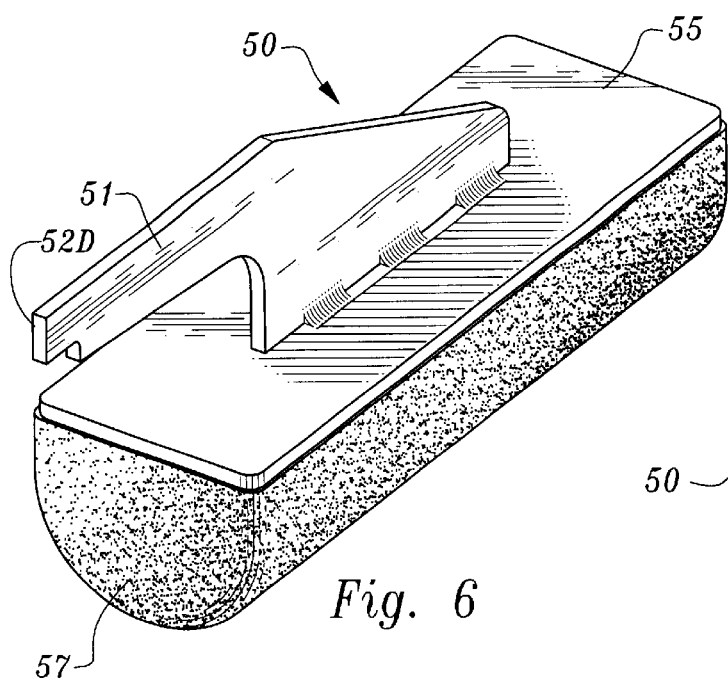
FIG. 6 is a rear perspective view of a second embodiment of this invention.
Figure 7:
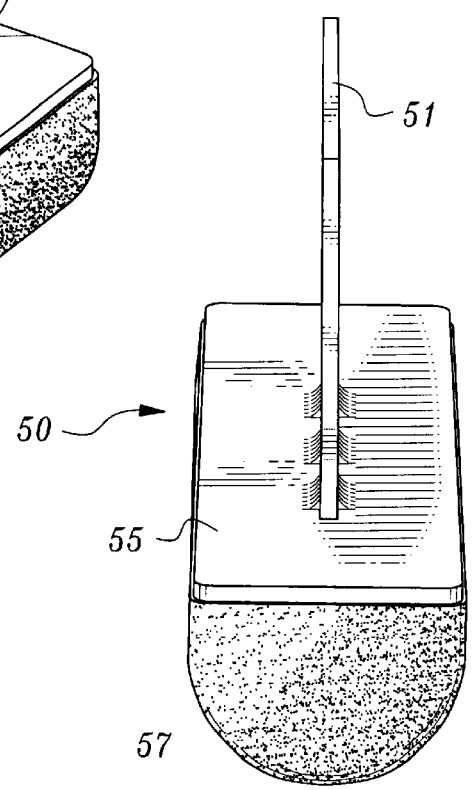
FIG. 7 is a front perspective view of the sander block of FIG. 6.
Figure 8:
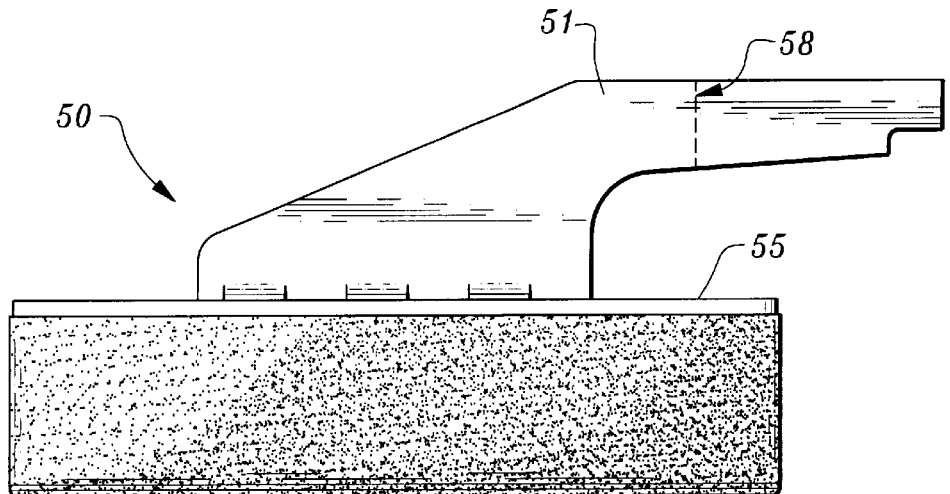
FIG. 8 is a left side elevational view of this second embodiment.

In FIGS. 6, 7 and 8 a second embodiment 50 is shown. Here as best seen in FIG. 7, the configuration of the arm 51 is similar to that shown for the first embodiment. As stated earlier the only potentially critical dimension is the side constituting the rear elevation of the insertion section; namely 52D, in order to obtain a secure fit of the tool in the slot of the saw chuck.

In FIGS. 6, 7, & 8, the configuration of the sanding member here designated 57 is hemispherical. The coextensive mount plate is designated 55 and the arm 51 for this second embodiment 50. Such a configured sanding member is used to create radiused areas for a smooth transition between horizontal and vertical surfaces. The phantom line is 58.

Figure 9:
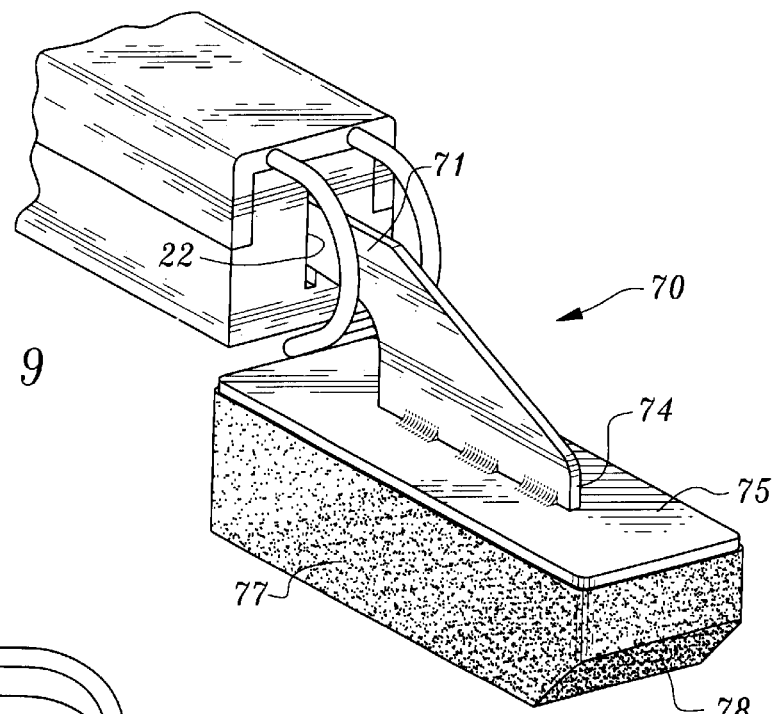
FIG. 9 is a top perspective view of a portion of the prior art minisaw and a third embodiment of this invention.
Figure 10:
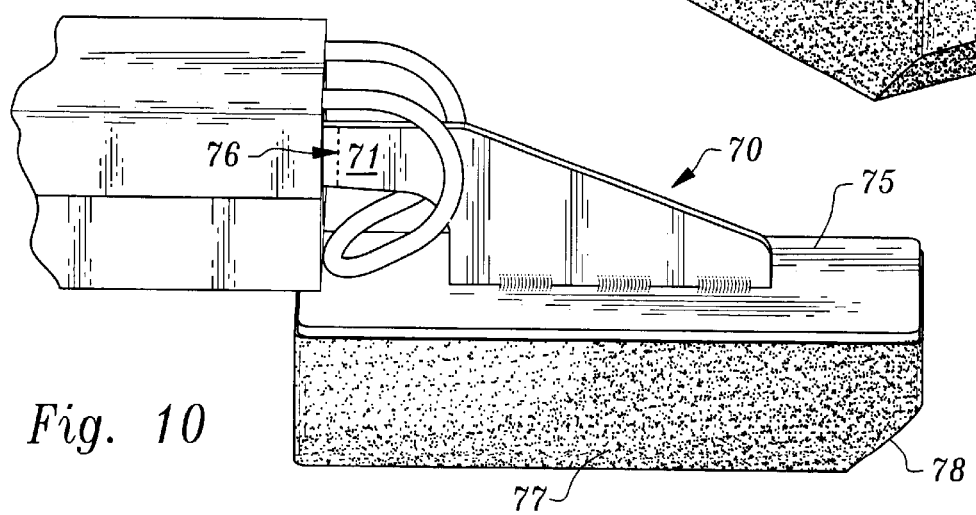
FIG. 10 is a top perspective view of the third embodiment as seen in FIG. 9.

The discussion now turns to FIGS. 9 and 10 wherein a third embodiment is shown and which is designated 70. The arm 71's insertion section is not visible as it is disposed within the slot 22 of the saw's chuck, per FIG. 10.

In the tool of FIGS. 9 & 10, an oblique edge 18 has been formed by chamfering the interface of the front and bottom edges of the sanding member, 77. This oblique edge is designated 78. Mount plate 75 is sized to be coextensive to the dimensions of the upper surface of the sanding member 77. The arm shown is a duplicate of the arm of FIG. 3, and as noted in FIG. 9 is designated member 71. This $3^{rd}$ embodiment is highly suited for end grain sanding of wood of for making a beveled edge in metal. In FIG. 10 and in FIG. 11, phantom line 76 designates the end of the insertion section. This phantom line serves a similar purpose as phantom line 38 discussed relative to FIG. 3.

In FIG. 11, a typical electrical mini reciprocating hand saw, sometimes designated a keyhole saw is seen. This prior art unit 10 has a chuck 11 with a receiving slot 12. The slot 12 has the insertion section of the $3^{rd}$ embodiment, 70, disposed therein. Set screw 13 when tightened impacts the insertion section and applies pressure thereon to retain said insertion section tightly in the slot. Set screw 23 of the air operated reciprocation tool acts in like manner. A thumb screw can be found instead of a set screw on some minisaws.

In FIG. 12, a variant of the mount plate element is seen in this version designated 90. The device features an arm 91 similar to the metal or plastic arms previously discussed. The mount plate 95 is formed integrally with the arm 91 as a one piece cast or molded unit. But here the mount plate is less than coextensive with the length and width of the upper surface of the sanding member. While acceptable, it is a less preferred design to have the non-coextensive mount plate 95. Whether full size coextensive or reduced one piece or two piece construction can be employed.

Previously it has been indicated that the sander blocks of this invention are intended to be used in a reciprocating manner. This reciprocation can come from the operation of the air or electrically powered tool, per FIGS. 1 and 11. It is also intended that the devices of this invention can be used with tools wherein the reciprocation is applied by the operator using hand movements. Such a tool is designated 80 in FIG. 13. Here too, the insertion section of the arm of the sanding block is retained in the slot,—not seen in FIG. 13—by Allen screw 81 Regardless of the mode of achieving reciprocation, the insertion section of the upstanding arm lies in the same forward-reverse plane as the direction of motion when engaged in the chuck of the saw.

In FIG. 14, a cutaway has been provided in the tool 80 to show how the insertion section lies within the slot 84 of the chuck 83. Since the device shown is the device of FIG. 3, no further discussion is needed about the sanding block 30. All sanding is carried out by the back and forth motion of the user's arm. While the embodiment of FIG. 3 is shown here, any of the three embodiments may be employed in like manner.

While three distinct configurations for the sanding member have been discussed, it is seen that almost any vertical cross section may be employed, provided that a surface is available for the attachment of the mount plate. The specific configuration will depend upon the intended use Any known material such as Carborundum, silica, diamond dust held by resin et cetera as used in other sanding blocks or on sheets of sand paper may be employed for the sanding members of the devices of this invention.

These tools will find favor with both hobbyist and serious craftsmen alike for working both in tight spaces and on small parts.

Among those who will benefit from the tools of this invention are woodworkers, ceramicists, metal workers, auto body and fender repair persons, and model makers, among others.

While not intended primarily for large reciprocating saws such as sold under the Milwaukee, Sawzall and Craftsman brands, no reason is seen why the sanding blocks of this invention could not be utilized with full-size electric reciprocating saws. It is to be noted however, that the control factor will be lacking when the sander blocks of this invention are used with such large tools.

It is also to be seen that as mentioned above the sanding blocks of this invention are meant primarily for use by tradesmen and hobbyists on small articles, or in difficult to reach areas. However, up sizing of the devices of this invention, such as 1-inch high by 3-inches deep by 4-inches long for a rectangular sanding member aspect of the device would permit these devices to be utilized on larger jobs when disposed within the slot chucks of electrically powered reciprocating saws. Thickness would still be in the $\frac{1}{16}$th to $\frac{1}{8}$ inch range.

Since the only change would be in relative sizing of parts, no reason is seen to exist for additional drawings especially since the mount plate would be of the same general thickness.

The term sanding member means any solid abrasive known to the art for material removal.

While in the drawings the horizontal cross section of the mount plate and the sanding member are substantially the same, such is not required. The mount plate can be dimensionally smaller than the sanding members, no matter the shape of the sanding member. See FIG. 12, which depicts a front elevational view of such a variant. Or the mount plate can fully cover the sanding member as is shown in FIG. 3.

Since certain changes maybe made in the above apparatus without departing from the scope of the invention herein involved, it is intended that all matter contained in the above description and shown in the accompanying drawings shall be interpreted as illustrative and not in a limiting sense.

I claim:

1. A sander block device for mounting in a slot of a chuck of a saw which operates using reciprocating motion, which sander block comprises:
   (A) a sanding member,
   (B) a mount plate, having a length and a width, a front edge and a back edge, said standing member having a length and width parallel to the length and width of said mount plate; said mount plate having two sides: namely a first side and a second side, the sanding member being mounted on the second side of said mount plate;
   (C) a single upstanding arm, having a multiplicity of edges, including a top edge and a bottom edge, a forward edge, and an oblique edge,
   said arm being secured normal to the first side of said mount plate, along the bottom edge of said arm; the front edge of said arm being normal to and commencing at the bottom edge of said arm and terminating at the commencement of the oblique edge of said arm which oblique edge is upwardly and rearwardly directed relative to the front edge, and which oblique edge terminates at the top edge of said arm, said top edge of said arm having a trailing edge which extends rearwardly beyond the bottom edge of said arm and said trailing edge extending beyond the rear edge of said mount plate for insertion into the slot of the saw's chuck.

2. The device of claim 1 wherein the mount plate is rectangular, and the sanding member is a rectangular solid.

3. The device of claim 2 wherein the sanding member has a front edge, and the front edge of the sanding member is chamfered.

4. The device of claim 1 wherein the sanding member is hemispherical.

5. The device of claim 1 wherein the arm and the mount plate are formed as one piece.

6. The device of claim 1 wherein the elevation of the insertion portion of the arm is of lesser elevation than the balance of said arm.

7. The device of claim 1 wherein the sanding member has a top surface and said top surface is less than coextensive with the second side of the mount plate to which it is secured.

8. The device of claim 1 wherein the device is dimensioned primarily to operate in a powered reciprocating saw and wherein the sanding member is about 4 inches long.

9. The device of claim 5 wherein the arm and mount plate are plastic.

10. the device of claim 1 wherein the arm and mount plate are both metal and the sanding member is hemispherical in vertical cross section.

11. The device of claim 1 wherein the arm and mount plate are both metal and the sanding member is a rectangular solid.

12. The device of claim 1 wherein the sustanding arm's front edge is disposed spaced back from the front edge of said mount plate.

13. The device of claim 1 wherein the bottom edge of said arm is spaced forwardly from the trailing edge of the mount plate.

14. The device of claim 12 wherein the bottom edge of said arm is spaced forwardly from the trailing edge of the mount plate.

15. The device of claim 1 wherein the length and width of the mount plate are coextensive to the length and width of the sanding member.

16. The device of claim 1 wherein the sanding member and the mount plate have the same horizontal dimension, and the sanding member is a rectangular solid.

17. A sander block device for use with any of an air powered, electrically powered and hand motion reciprocating action minisaw, each of which saws has a chuck with a slot for receiving a portion of a sander block, which sander block comprises:
   (A) a sanding member,
   (B) a mount plate, having a length and a width, a front edge and a back edge, said sanding member having a length and width parallel to the length and width of said mount plate; said mount plate having two sides: namely a first side and a second side, the sanding member being mounted on the second side of said mount plate;

(C) a single upstanding arm, about 1/16th to 1/8th inch thick, having a multiplicity of edges, including a top edge and a bottom edge, a forward edge, and an oblique edge, said arm's bottom edge being secured normal to the first side of said mount plate, the front edge of said arm being normal to and commencing at the bottom edge of said arm and terminating at the commencement of the oblique edge of said arm which oblique edge is upwardly and rearwardly directed relative to the front edge, and which oblique edge terminates at the top edge of said arm having a trailing edge which extends rearwardly beyond the bottom edge of said arm and said trailing edge extending beyond the trailing edge of said mount plate for insertion into the slot of the saw's chuck.

18. The device of claim 17 wherein the arm and mount plate are both steel, and the two components are welded together.

19. The device of claim 17 wherein the arm and mount plate are both metal and the sanding member is a rectangular solid having a top surface, which top surface is coextensive with the mount plate.

20. The device of claim 17 wherein the upstanding arm's front edge is disposed spaced back from the front edge of said mount plate.

21. The device of claim 17 wherein the bottom edge of said arm is spaced forwardly from the trailing edge of the mount plate.

22. The device of claim 20 wherein the bottom edge of said arm is spaced forwardly from the trailing edge of the mount plate.

23. The device of claim 17 wherein the length and width of the mount plate are coextensive to the length and width of the sanding member.

24. The device of claim 17 wherein the top edge of said arm extends rearwardly and parallel beyond the trailing edge of aid arm mount plate.

* * * * *